Jan. 30, 1968   J. SINGERMAN   3,365,816
VISUAL DEMONSTRATION APPARATUS
Filed March 11, 1965   2 Sheets-Sheet 1
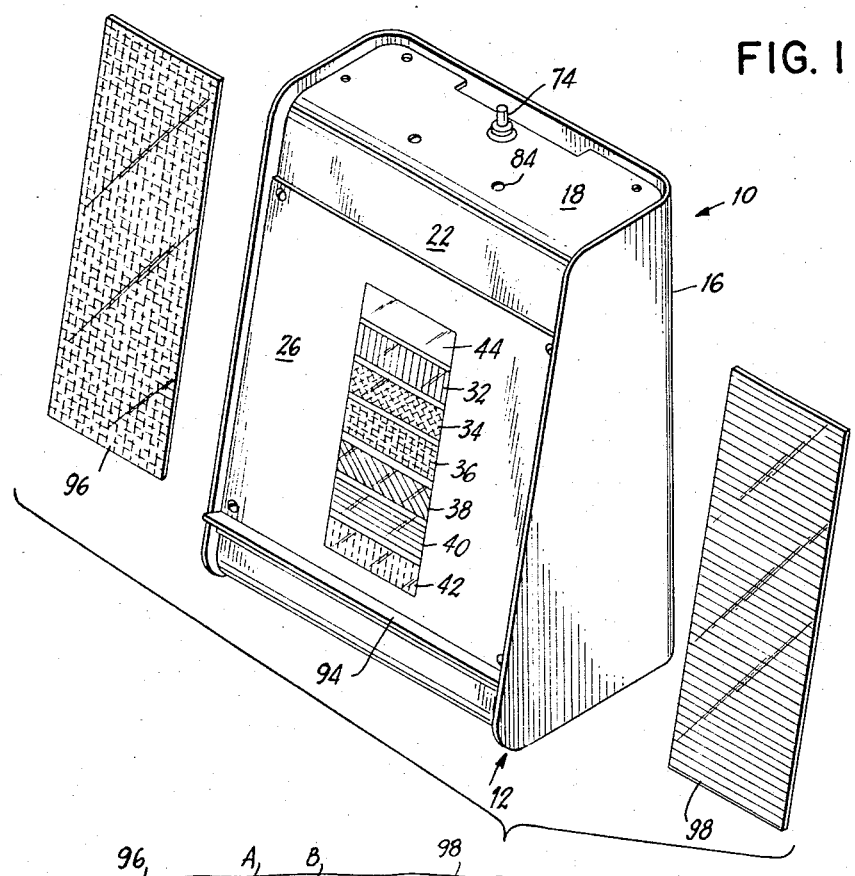
FIG. 1
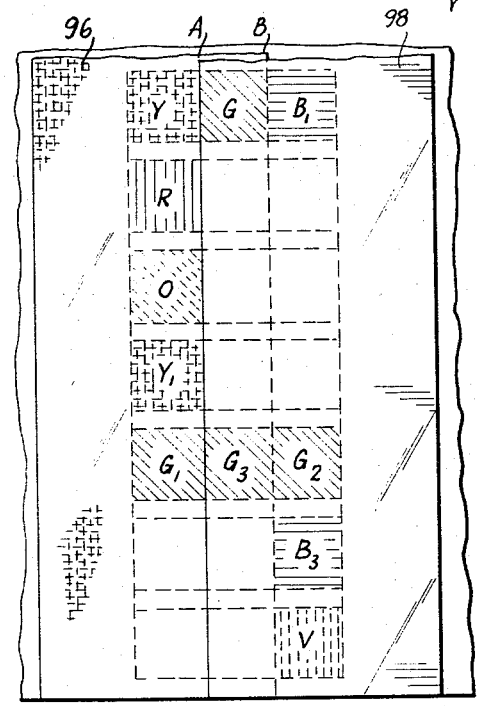
FIG. 3
INVENTOR.
JOSEPH SINGERMAN
BY 
ATTORNEY INVENTOR.
JOSEPH SINGERMAN
BY Howard E. Crackenback
ATTORNEY

United States Patent Office 3,365,816
Patented Jan. 30, 1968

3,365,816
VISUAL DEMONSTRATION APPARATUS
Joseph Singerman, 70—20 108th St.,
Forest Hills, N.Y. 11375
Filed Mar. 11, 1965, Ser. No. 438,973
4 Claims. (Cl. 35—28.3)

ABSTRACT OF THE DISCLOSURE

Visual demonstration apparatus for explaining to students how the color of a colorant such as a paint pigment or a dye is determined by its spectral transmittance and why a mixture of colorants will result in a different color and what that color will be comprising a spectral assembly for simulating a spectrum which comprises a plurality of spectral color filters and an arrangement of spectral colorants particularly adapted to be disposed in spectral transmitting relationship with respect to such spectral assembly, said arrangement being so constructed and arranged as to enable the transmission of rays of light from a light source through said spectral assembly, and through said colorants individually and simultaneously.

---

The present invention pertains, generally to visual demonstration apparatus and, more particularly, to visual demonstration apparatus particularly adapted to be used for instruction in and the understanding of the principles of subtractive color synthesis.

Subtractive color synthesis is a method or process that uses two or more super-imposed colorants which selectively absorb their complementary colors from white light. Accordingly, it will be understood that such a process or method plays a significant and major role in determining the color which results from a mixture of such material as water colors, dies, and paints or paint pigments.

Accordingly, it is a primary object of the present invention to provide visual demonstration apparatus that is particularly adapted to be used for instruction in and the understanding of the principles of subtractive color synthesis.

Another primary object of this invention is to provide visual demonstration apparatus that is particularly adapted to be used for instruction in and the understanding of the principles of subtractive color synthesis, said apparatus being so constructed and arranged as to enable students, for example, to observe simultaneously the visual colors as well as the transmission properties of various color media, or colorants, both individually and in mixture or superposition.

Yet another primary object of the present invention is to provide visual demonstration apparatus that is particularly adapted to be used for instruction in the understanding of the principles of subtractive color synthesis, said apparatus being so constructed and arranged as to present an inexpensive compact device enabling an observer to visualize a complete display of the various colors transmitted by different colorants, at a high level of luminous intensity, suitable for demonstration in an ordinary classroom equipped with the usual means for subduing light from windows and other extraneous sources.

A further primary object of this invention is to provide visual demonstration apparatus that is particularly adapted to be used for instruction in and the understanding of the principles of subtractive color synthesis, said apparatus being so constructed and arranged as to enable the effectuation with extreme facility of analysis of the pertinent color phenomenon in a qualitative, untechnical and unsophisticated form, so as to be readily intelligible to the very young and to the beginning student, without requiring the student to interpret transmission curves or other technical data.

A still further primary object of the present invention is to provide visual demonstration apparatus that is particularly adapted to be used for instruction in and the understanding of the principles of subtractive color synthesis, said apparatus being so constructed and arranged as to facilitate a qualitative analysis of the selected transmission of various colorants without the need for special optical devices, photocells or galvanometers.

Other objects and important features of the present invention will be apparent from a study of the specification following, taken with the drawing which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIGURE 1 is a perspective view of a visual demonstration apparatus constructed in accordance with the principles of the present invention;

FIG. 3 is a partial elevational view of the device illustrated in FIGS. 1 and 2.

Figure 2:
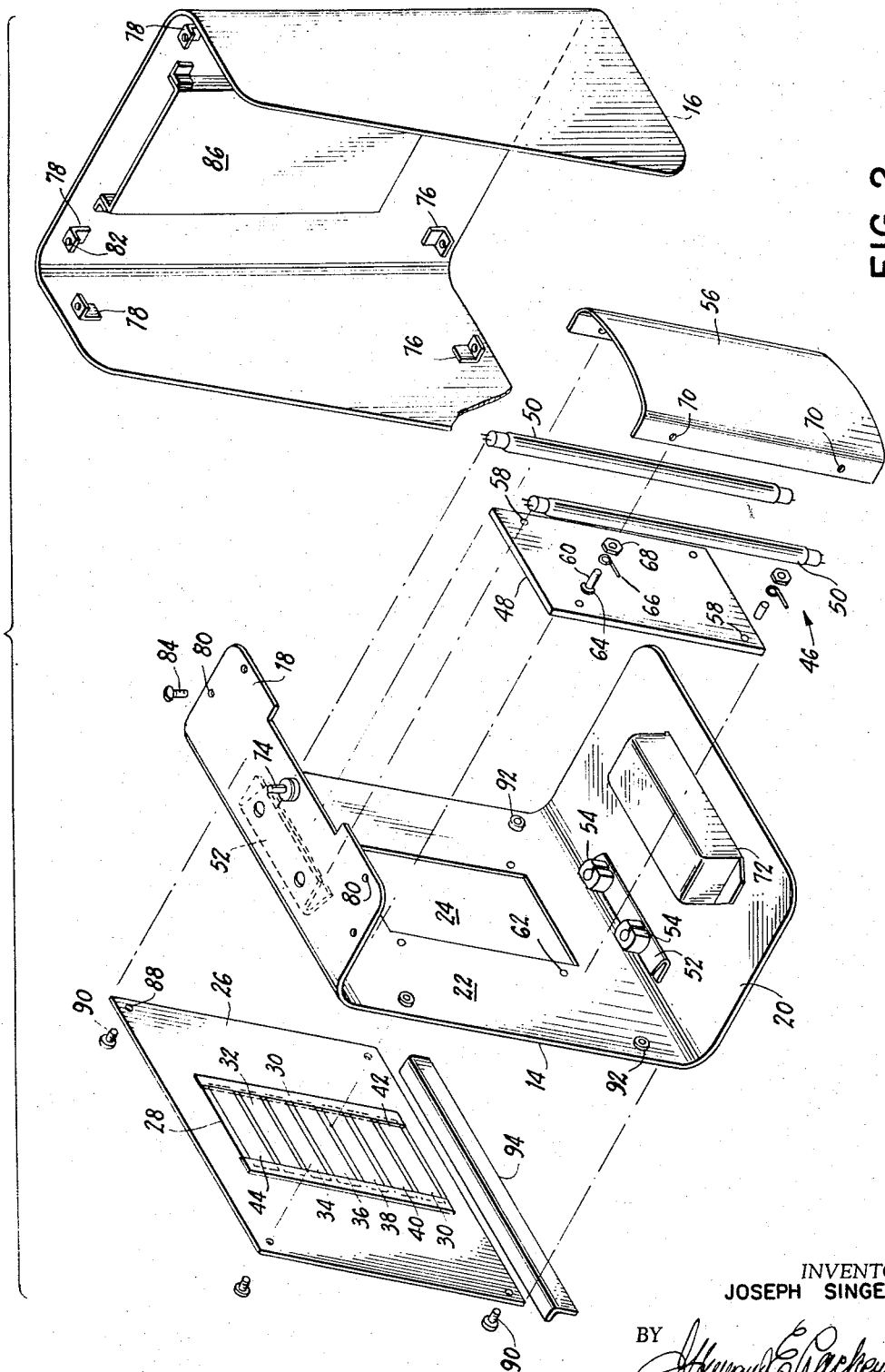
FIG. 2 is an exploded isometric view of the apparatus illustrated in FIG. 1.

The hue or color of a colorant, such as the pigment in a coat of paint, is generally considered to be due to the color or colors of light reflected by that paint. Actually, much of this light has, in fact, penetrated or passed through the pigment particles before reflection. Therefore, what is often times arbitrarily referred to as reflected light is, in these instances, light which has been transmitted through pigment particles. This is to be understood since it is basic to an understanding and comprehension of the color of various colorants and of mixtures of colorants.

A colorant, such as a dye or a paint pigment, presents a hue or color that essentially is due to the selective transmission of limited portions of the spectrum by the solution or by the pigment particles. The colorant functions, in effect, as an absorber or subtractor of the remaining portions of the spectrum. Therefore, mixing colorants, or color synthesis, effects the subtraction of more extensive portions of the spectrum. The resulting visual color is determined by the selectively transmitted or un-subtracted portion of the spectrum.

With reference now to the drawings, an exemplary preferred form of visual demonstration apparatus constructed in accordance with the principles of the present invention is illustrated therein, and is shown as invoking the use of a plurality of transparent plastic sheets of various colors, each representing a particular colorant. This plurality of transparent sheets may, for example, be considered to correspond with a set of water colors or color inks. As will be described more fully hereinafter, the superposition of the transparent colored sheets or colorant filters, one upon another, and at the same time enabling the rays emitted from a suitable source of light to pass through this assembly of filters, enables the visualization of the color that is determined by or results from that portion or those portions of the spectrum that pass through the filters so assembled. The remaining spectral colors are absorbed by one or the other of these colorants comprising the mixture.

The visual demonstration apparatus constructed in accordance with the principles of the present invention, generally designated by the reference character 10, and illustrated in the drawings, comprises a housing 12, which in turn, comprises a front housing plate 14 and rear housing plate 16. The front housing plate 14, which may be fabricated of any suitable material, is of generally a U-shaped configuration having a top wall 18, a bottom wall 20, and a front or vertically disposed wall 22. The front wall 22 comprises a generally rectangularly configured aperture 24 extending therethrough, the purpose of which will hereinafter be rendered manifest.

A spectrum plate or assembly 26 is particularly adapted to be removably mounted or positioned upon the front wall 22 of the housing plate 14. The spectrum assembly 26 comprises an aperture 28 corresponding generally in dimension and configuration with the aperture 24. A plurality of channels 30 are fixably positioned upon the inner face of the plate or assembly 26, and along the vertical edges of the aperture 28. A plurality of suitable spectral filters are particularly adapted to be removably disposed within the channels. Each spectral filter is particularly adapted to transmit a limited band of wave lengths. Thus, spectral filter 32 transmits spectral red light, spectral filter 34 transmits spectral orange light, and each of the spectral filters 36, 38, 40, and 42 are particularly adapted to transmit that portion of the spectrum which provides the spectral colors yellow, green, blue and violet, respectively. The spectral filters 32–42 are fabricated of such a material and in such a manner as to enable each of them to be considered as transmitting only a particular, narrow band of wave lengths, thereby providing a particular spectral color of light. A spectral filter 44 is also provided, the same being colorless, and therefore being completely transparent to the white light from a source, hereinafter to be described. If desired, the filter 44 may comprise a neutral density filter, or grey filter, a limiting of the brightness of the light from the source without affecting its color being the result. The filters 32–44 are of generally rectangular configuration, and in one dimension corresponds generally with a dimension of the apertures 24 and 28. In another dimension of the filters, when taken together, they correspond with another dimension of the apertures. Accordingly, when the spectrum plate or assembly 26 is viewed by transmitted light from a suitable source, the plate will display a white area, as defined by the rectangularly configured area occupied by the filter 44 (since this filter passes white light), and a simulated spectrum in the form of an array of areas of colored lights.

The spectrum plate or assembly 26 may be fabricated of any suitable material, and, for example, may be fabricated of a sheet metal, glass, and the like. In the latter instance, it is preferred that the glass material be colorless and transparent. The filters 32 to 42 are each of them particularly adapted to transmit a limited band of wave lengths, through an area of rectangular configuration, corresponding generally to the dimensions of the corresponding filter. Accordingly, and if desired, a mask (not shown) may be inserted or positioned between the plate 26 and the filters, within the channels 30, which mask will comprise a plurality of rectangularly configured cut-outs corresponding in number and dimension to the number and dimensions of the filters, respectively. The mask will, therefore, delineate the rectangular areas through which the light of the apparatus spectral colors will pass, and, therefore, is preferably fabricated of an opaque material such as black paper.

A light source assembly 46 is particularly adapted to be positioned upon the front wall 22, and, specifically, upon that side thereof opposite the side upon which the plate 26 is mounted. The assembly 46 comprises a light transmitting and diffusing element 48 that may be fabricated of any suitable material, such as white flashed opal glass. The size or dimensional extent of the element 48 slightly exceeds that of the aperture 24, thus facilitating mounting of this element upon the wall 22. The light source assembly 46 preferably further comprises a plurality of fluorescent bulbs 50, though it is, of course to be understood that other suitable devices for emitting rays of light may be used. A plurality of mounting plates 52 are provided, one each being positioned upon the upper and lower walls 18 and 20, respectively, the plates 52 being provided with suitable sockets 54 for receiving the fluorescent bulbs 50, in a manner that is conventional and well known to those skilled in the art. The plates 52 may be fabricated on any suitable material, and preferably are reversed upon themselves to insure that, when the bulbs 50 are positioned within the sockets 54, they will be relatively secure. A backing plate or shield 56 is particularly adapted to be disposed rearwardly of the light transmitting element 48 and the light emitting elements or fluorescent bulbs 50, this plate being particularly adapted to perform the function of reflecting the light emitted rearwardly of the bulbs 50, thus enhancing the degree and uniform distribution of the luminosity of the spectral filters.

The assembly 46 may be mounted or positioned upon the wall 22 in any suitable manner, and, for example, the element 48 may be provided with a plurality of apertures 58 through which a bolt 60 is particularly adapted to pass. The wall 22 is similarly provided with a corresponding number of apertures 62. Since the plate or assembly 26 is to be mounted upon the forward face of the wall 22, it will be understood that the bolt 60 preferably is of the type having a flat head 64, and is, therefore, to be inserted through the apertures 62 and 58 from that side of the wall 22 upon which the plate 26 is to be mounted. A spring clip 66 is adapted to be positioned upon the shank of the bolt 60, and secured thereupon by means of a nut 68, which, at the same time, performs the function of securely positioning the element 48, and therefore the assembly 46, upon and with respect to the wall 22. The reflecting element or plate 56 comprises a plurality of apertures 70 into which the clips 66 are particularly adapted to be inserted. Preferably, the plate 56 is removable with respect to the element 48, and, therefore, is preferably fabricated of a resilient material, that, at the same time, provides suitable light reflecting characteristics.

It will now be understood that the assembly 46 comprises suitable electrical wiring (not shown) that will enable it to receive electrical energy from an external source, such as an ordinary and conventional electrical outlet that may be found in a room, and, of course, suitable wiring that extends between the elements of the assembly 46, thus completing a circuit therebetween. A ballast 72 of any suitable and conventional construction may be positioned upon the lower wall 20, and connected in the aforesaid circuit, to provide the starting and operating conditions required by the light tubes 50. A suitable switch 74 may be positioned upon the upper wall 18 and connected in the circuit, to provide an on-off control for the light emitting elements of fluorescent bulbs 50.

The front housing plate 14 is partciularly adapted to be removably positioned upon and with respect to the rear housing plate 16, and, to this end, the latter is provided with a plurality of angle brackets 76 which, in effect, are capable of functioning as a shelf upon which the lower wall 20 of the plate 14 is particularly adapted to be positioned. Similar angle brackets 78 are mounted upon the rear plate 16, upon which the upper wall 18 is particularly adapted to be positioned. In addition, the upper wall 18 of the plate 14 is provided with suitable apertures 80 that are disposable in alignment with apertures 82 extending through the angle brackets 78 when the upper wall is positioned thereupon. Suitable fasteners 84, such as screws, are capable of being run home through the aligned apertures 80 and 82 to fixedly secure the front plate 14 to the rear plate 16. Though they are not shown, similar apertures may be provided in the bottom wall 20. A backing wall 86 is fixedly positioned upon the rear housing plate 16 to provide stability to the structure, and is preferably fabricated of a material that is capable of reflecting light if it is desired to eliminate the use of the light reflecting element or plate 56. By virtue of its configuration, the backing wall 86 also provides a protective and storage pouch for several colorant filters hereinafter to be described.

With particular reference to FIG. 1, the visual demontration apparatus 10 of the present invention is illustrated therein in completed form, and thus will be seen in the manner in which the spectrum plate or assembly 26 is positioned upon the front wall 22. More particularly, the plate 26 is provided with suitable apertures 88, as is the front wall 22 of the housing plate 14, through which, when the apertures are disposed in alignment with one another, suitable fasteners 90, such as screws, are particularly adapted to be run home. The wall 22, on the opposite side thereof may be provided with nuts 92 to preclude loosening or accidental dislodgement of the plate 26 from the front wall 22. A shelf 94 is particularly adapted to be fixably positioned upon the front wall 22 below the plate 26, for a purpose presently to be described.

In the operation of a visual demonstration apparatus constructed in accordance with the principles of the present invention, suitable colorant filters 96 and 98 are particularly adapted to be positioned and rest upon the shelf 94. Since the primary objective of this invention is to provide an apparatus that visually demonstrates color synthesis, the colorant filters will preferably be fabricated of any suitable material that enables those spectral colors that are not absorbed to pass therethrough. Such a material may be a suitable plastic, it now being understood that any number of colorant filters 96 and 98 of different hues or colors may be provided.

It will now be assumed that the colorant filter 96 is of a yellow hue, and the colorant filter 98 of a blue hue. Accordingly, it will be seen how the use and operation of the present invention in visually demonstrating and explaining why a mixture or synthesis of these two hues or colorants produces the hue green. The filters 96 and 98 are positioned upon a shelf 94, as hereinafter pointed out, and are disposed so that each filter partially overlaps the filters 32 through 44, while at the same time, partially overlapping one another. The partial overlap of the filters 96 and 98 themselves encompass a central portion of the simulated spectrum, as delineated by the lines A and B, the line B corresponding to the right-hand longitudinal edge of the yellow colorant filter 96 which extends along and adjacent to the outer edges of the simulated spectrum, and the line A representing the left-hand longitudinal edge of the blue colorant filter 98 which extends along and adjacent to the other outer edge of the simulated spectrum.

In the white rectangular area represented by the filter 44, the colorant filter 96 will be seen to appear yellow, as indicated at Y. And, in the same area the blue colorant filter 98 will be seen to appear blue, as indicated at $B_1$. Since, however, the filters 96 and 98 are disposed in a partially overlapping relationship with respect to one another, at the central portion of the simulated spectrum as delineated by the lines A and B, then the color green will be seen at the upper white rectangular area is indicated at G.

To explain this appearance of the hue green from the mixture or synthesis of yellow and blue hues, one will observe at a glance, as shown in FIGURE 3, the spectral transmittance of each of the two colorant filters 96 and 98, where each lies across or partially overlaps a portion of the simulated spectrum represented by the spectral filters 32 through 42 and the colorless spectral filter 44. The spectral hues or colors red, orange, yellow and green are seen through the yellow colorant filter 96 at R, O, $Y_1$ and $G_1$ respectively. Accordingly, it will be considered readily apparent that the yellow colorant filter 96 passes these spectral hues or colors, while absorbing or stopping the remaining spectral hues or colors, namely blue and violet. Similarly, the blue colorant filter 98 is seen to transmit the spectral hues or colors green, blue and violet, as indicated at $G_2$, $B_3$ and V, respectively. It absorbs or stops the remaining spectral hues or colors red, orange, and yellow. In the portion of the spectrum where the two colorant filters 96 and 98 overlap, namely, between the delineating lines A and B, it will be understood that green is the only spectral hue or color not absorbed by one or the other of the two colorant filters. The transmitted spectral green light is seen at $G_3$ which now visually demonstrates or explains why, as seen in the rectangular area encompassed by the white colorant filter 44, mixing of common yellow and blue hues or colorants produces the green hue, as indicated at G.

It will now be understood that the hues or colorants yellow and blue are hereinbefore alluded to in an exemplary manner only, to thus facilitate understanding the function, use and operation of the present invention. As will be considered readily apparent, any desired combination of colorant filters of different hues may be made to be used to demonstrate that, in each case, the hue or color resulting from a mixture is that determined by their common spectral transmittance.

The instructor may desire that the spectrum plate or assembly 26 be positioned or placed upon the stage of a projector. In this manner, the projector lamp will comprise that of the light source, and a brilliant, and enlarged image of the spectrum will be focused on a viewing screen. Colorant filters will be tested in the manner described above, enabling the students to see the same results as a bright image on the screen.

At this point, the desirability of mounting the spectrum plate or assembly 26 upon the housing plate 14, and positioning the light source assembly 46 within an enclosure defined by the plate 14, and the rear housing plate 16, will be understood, in that, in this manner, the front and rear housing plates 14 and 16, respectively, will serve to shield the spectrum plate from stray light that might detract from the brilliance of the colors. In addition, the ledge 94 and the portions of the side walls of rear housing plate 16 which extend beyond the front face of the wall 22 serve to shield the spectrum plate and the mounted colorants from ambient light.

It will now further be understood that numerous modifications of a visual demonstration apparatus construction in accordance with the principles of the present invention are contemplated within the scope thereof. For example, it is conceivable that dye solutions may be used to study different colorings. Thus, each particular colorant solution would be placed in, in an exemplary form, a corresponding one of a plurality of vessels having transparent front and back faces, and side members of opaque material. The vessels would be disposed or positioned in a rack for supporting them. It is desirable to fabricate the side members of the vessels of an opaque material. Otherwise, the rack itself would of necessity incorporate separators that would be opaque to light. The vessels, which in use would number three, would be disposed in front of a spectrum plate of a construction similar to that of the spectrum plate or assembly 26 hereinbefore described and discussed. The colorant solutions under study, such as hues the yellow and blue, would be placed in corresponding vessels. A third vessel would have disposed therewithin a mixture of the two colored solutions. Accordingly, when a source of light positioned behind the spectrum plate is activated, an observer will visualize in the white area, corresponding to the colorless filter 44, the hue or color of each colorant solution as well as that of the mixture or synthesis thereof, and, along the remaining portions of the simulated spectrum, which in this embodiment will correspond generally with the simulated spectrum defined by the spectral filters 32 through 42, the spectral color or colors transmitted by each individual solution.

The analysis and explanation are substantially the same as that applicable to the use of colorant filters hereinbefore set forth and described.

Of necessity, each colorant solution must contain a sufficient concentration of the particular dye in order for it to show a marked absorption of certain spectral colors, but not so concentrated as to render the colorant too dark for classroom visibility. The optimum strength is not identical for different dyes. It is also desirable to avoid the need for maintaining a large inventory of the various dye solutions in, for example, bottles. To these ends, each solution may be provided in very concentrated form in small dropper bottles, each vessel having inscribed thereupon a mark to indicate the quantity of water required, and the level to be reached thereby. The concentration of each colorant dye solution is thus individually and carefully made at such a level that a fixed number of drops will provide, with the measured and required volume of water, a solution of color concentration suitable for the purpose of the demonstration. The instructor need simply add water to the water level mark, and then the pre-determined number of drops of whichever colorant he wishes to test. Accordingly, not only will the need for large stocks of dye solutions be avoided, but so too will the need for trial and error adjustment of each solution. The saving of time and avoidance of annoying distractions will therefore be sustantially increased.

An instructor may proceed in either of two ways in testing a mixture or synthesis of two colorants. Thus, there may be applied the stated number of drops of each of the two concentrates to water in one vessel, or two separate dilutions may be made, which are then mixed. A central level mark may be inscribed on each vessel to aid in the latter procedure. One diluted colorant solution is then poured into the level of this central mark, then the other colorant solution is added to the level of an upper mark, uniform mixture being completed by stirring.

Other modifications will fall within the scope of the present invention such as fabricating any one of the spectral filters in the spectrum plate so that it comprises a combination of two or more filter sheets selected to transmit a desired narrow spectral band. In combination, such a plurality of filter sheets will act or function as a single filter having the desired property. Similarly, any one of the colorant filters may comprise two or more layers of filter sheets having the combined effect of a desired selective transmission. Of course, it will be realized that the simulated spectrum may comprise a suitable array of any number of spectral filters, and may even comprise a single transparent sheet upon or within which is applied an array of dyes or similar materials that are selected and disposed to transmit the range of spectral colors. However, each spectral filter need not have an absolute cut-off point. It is acceptable that it transmit essentially a suitable narrow portion of the spectrum for the purpose of the instruction methods available with the instant visual demonstration apparatus. Still further, the spectrum plate may be fashioned in the form of a lantern slide, so that demonstration, instructions or teaching may be accomplished through the medium of a slide projector.

In addition, certain details of construction may be varied, while still falling within the scope of the present invention, such as invoking the use of sunlight or diffused sky light as a substitute for the light source hereinabove described and discussed. A spring or spring activated bar may be provided to hold the colorant filters in the desired position, contiguous with the spectrum plate. A solvent other than water may be used with the colorant solutions.

In accordance with the above, the present invention will be seen to contemplate a visual demonstration apparatus particularly adapted for use in visually demonstrating color synthesis. To this end, an apparatus 10 is provided comprising a spectral assembly for simulating a spectrum, such an assembly being the plate or assembly 26 illustrated in the drawing, and comprising a plurality of spectral color filters, namely, the filters 32 through 44. In addition, an apparatus constructed in accordance with the principles of this invention will comprise an arrangement of spectral colorants that are particularly adapted to be disposed in spectral transmitting relationship with respect to the aforesaid assembly, and in the illustrated exemplary form of the invention, such an arrangement comprises the colorant filters 96 and 98. In another exemplary form hereinbefore disclosed, such an arrangement will comprise a plurality of vessels, usually numbering three, in one of which there is disposed one colorant, in another of which there is disposed another colorant, and in the last of which there is disposed a mixture of these colorants. Accordingly, it will be seen that the spectral colorant arrangement is so constructed and arranged as to enable the transmission of rays of light from a light source, such as the light source assembly 46, through the spectral assembly, such as the assembly 26, and thence through the colorants individually and simultaneously. In the former instance, the simultaneous selective light transmission is accomplished by the partial overlapping of the colorant filters 96 and 98, whereas in the latter instance, the simultaneous selective light transmission is accomplished through the medium of the mixture of colorants in one of the vessels.

After reading the foregoing detailed description of an exemplary and illustrated form of the present invention, it will be understood that the objects set forth at the outset of this specification have successfully been achieved.

However, while the invention has been shown, illustrated, described and disclosed in terms of and illustrated embodiment or modification which it has assumed in practice, the scope of the invention should not be deemed to be limited thereby, such other embodiments or modifications intended to be reserved especially as they fall within the scope of the claims here appended.

What is claimed is:

1. A visual demonstration apparatus particularly adapted for use in visually demonstrating colorant synthesis comprising, in combination:
   a housing;
   a spectral assembly comprising a plurality of at least six spectral color filters;
   means for supporting said spectral assembly upon said housing;
   said spectral assembly being of substantially elongated configuration, each color filter of said spectral assembly being of substantially equal density throughout, and being constructed and arranged to transmit only a limited and narrow portion of the visual spectrum;
   said plurality of at least six spectral color filters being arranged in adjacent sequence in the order of their respective spectral positions so as to enable the transmission of rays of light from a light source therethrough to display a modified spectrum of light;
   a plurality of pairs of separate colorants of substantially the same density throughout particularly adapted to be used with and disposed in spectral transmitting relationship relative to said spectral assembly;
   said pairs of separate colorants being of such dimensions that they can readily be supported in side-by-side and partially overlapping relationship with respect to one another in which said pairs of separate colorants completely overlie said spectral assembly;
   said pairs of separate colorants being so constructed and arranged as to enable the transmission of rays of light of said modified spectrum through said colorants individually and simultaneously, and further being constructed and arranged so as to enable the colorants of each separate pair to readily be interchanged with the colorants of other pairs, as well as to be used singly, and
   means for supporting said pairs of separate colorants in said spectral transmitting relationship with respect to said spectral assembly;

enabling the principles of colorant synthesis to be understood with extreme facility as to the selective transmission and absorption of the spectral hues transmitted through the color filters of said spectral assembly from the light source are selectively transmitted through said colorants both individually and simultaneously to display the color produced by said colorants alone and in combination with each other and with each color of the visual spectrum.

2. A visual demonstration apparatus as defined in claim 1, wherein there is provided:

an element for supporting said colorant filters in continuous relationship with respect to said spectral assembly;

said supporting element being so constructed and arranged as to enable said colorant filters to be disposed in the aforesaid partially overlapping relationship with respect to one another.

3. A visual demonstration apparatus as defined in claim 2, wherein said spectral assembly further comprises:

a colorless area.

4. A visual demonstration apparatus as defined in claim 3, wherein there is further provided:

a plurality of housing plates particularly adapted to be structurally operatively associated with one another;

said housing plates being so constructed and arranged as to shield said spectral assembly and said colorant filters from ambient light and stray light.

References Cited

UNITED STATES PATENTS

| | | | |
|---|---|---|---|
| 829,337 | 8/1906 | Herr | 88—107 X |
| 886,684 | 5/1908 | Dukelow | 88—107 |
| 1,013,937 | 1/1912 | Hatt | 88—107 |
| 2,120,499 | 6/1938 | Mackay | 35—28.5 |
| 2,917,836 | 12/1959 | Balinkin et al. | 35—28.3 |
| 2,962,825 | 12/1960 | Bravo et al. | 40—106.1 |
| 3,069,788 | 12/1962 | Balinkin | 35—28.3 |
| 3,088,226 | 5/1963 | Watterson et al. | 35—28.3 |

EUGENE R. CAPOZIO, *Primary Examiner.*

H. S. SKOGQUIST, *Assistant Examiner.*